(12) United States Patent
Danielson

(10) Patent No.: US 6,422,816 B1
(45) Date of Patent: Jul. 23, 2002

(54) VARIABLE PITCH PROPELLER CONTROL SYSTEM

(75) Inventor: David R. Danielson, Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 09/862,136

(22) Filed: May 21, 2001

(51) Int. Cl.[7] ............................................. B64C 11/40
(52) U.S. Cl. ........................ 416/35; 415/36; 415/44; 415/61
(58) Field of Search ......................... 416/35, 44, 61, 416/162, 36

(56) References Cited

U.S. PATENT DOCUMENTS

| | | | | |
|---|---|---|---|---|
| 5,042,966 A | * | 8/1991 | Schwartz et al. | ............ 416/47 |
| 5,174,718 A | * | 12/1992 | Lampeter et al. | ............ 416/48 |
| 5,897,293 A | * | 4/1999 | Arel et al. | .................... 416/46 |
| 6,059,525 A | * | 5/2000 | Danielson et al. | ............ 416/46 |

* cited by examiner

Primary Examiner—Edward K. Look
Assistant Examiner—Ninh Nguyen

(57) ABSTRACT

Maintenance requirements on a variable pitch propeller control system are minimized by eliminating the need for mechanical elements, such as a flyweight, mechanism in a secondary control for the variable pitch propeller. The system includes a secondary control (40) operating a pitch change mechanism (24) in response to the existence of at least one undesirable propeller condition and includes a target (34), (38) along with a target pickup (32), (36) for sensing the target (34), (38) and providing information to a function generator (76) which in turn provides information to a logic device (78), (80), (82), (84), (86), (88), (94) which in turn is connected to the pitch change mechanism (24) for operating the same.

8 Claims, 2 Drawing Sheets

VARIABLE PITCH PROPELLER CONTROL SYSTEM

FIELD OF THE INVENTION

This invention relates to a variable pitch propeller control system, and more particularly, to a variable pitch propeller and control system including a main pitch control for normally operating the pitch change mechanism of a variable pitch propeller along with a secondary control for operating the pitch change mechanism as a back up to the main control and which does not rely upon flyweight mechanisms or the like as part of the second control.

BACKGROUND OF THE INVENTION

Conventional variable pitch control systems for propellers employed in aircraft typically include a main control having two channels for redundancy which normally operate a pitch control mechanism in the propeller and a flyweight mechanism that acts as a back up or second control for the main control system. In systems of this sort, the flyweight mechanism is rotated with the propeller and as propeller angular velocity changes, the flyweights change their position in proportion to the angular velocity of the propeller. In the usual case, a spring or the like biases the flyweights toward one position and as the propeller angular velocity increases, the flyweights move against the bias of the spring. This movement is conventionally conveyed to a hydraulic valve which controls the flow of hydraulic fluid to a pitch change mechanism incorporated in the propeller itself. Should an undesirable propeller condition occur, such as an overspeed condition or movement of the propeller blades to a finer pitch than a so-called "flight idle" position, whereat the pitch of the blades is finer than a coarse position necessary to sustain flight, the valve controlled by the flyweight mechanism will direct hydraulic fluid at a greater pressure to the pitch change mechanism to move the blades toward a more coarse position, i.e., move the blades toward a feathered position, to alleviate the undesirable condition.

Such systems, like any other, require periodic maintenance to assure that they are operating properly, which is to say, to assure that they become operational at the proper threshold of propeller speed and/or flight idle pitch, amongst other things. At the same time, they must be adjusted so they do not interfere with the operational characteristics dictated by operation of the main control.

Experience with such systems in the field has tended to show that maintenance personnel working on such systems were spending more time adjusting and "tweaking" the mechanical back-up system, that is, the flyweight control, than on maintaining the main controls. This is not to say that maintenance of the main control is neglected, but rather, only that the costs of maintenance are undesirably large as a result of the effort to continually and properly adjust the secondary control system including a flyweight mechanism.

The present invention is directed to overcoming one or more of the above problems.

SUMMARY OF THE INVENTION

It is the principal object of the invention to provide a new and improved variable pitch propeller control system. More specifically, it is an object of the invention to provide a variable pitch propeller control system with a secondary control that eliminates mechanical components, such as a flyweight mechanism, that require an inordinate amount of time being maintained or adjusted to achieve proper balance in the system and compatibility with the main control.

An exemplary embodiment of the invention achieves the foregoing objects in a construction that includes a propeller having a hub rotatable about a rotational axis, and at least two propeller blades journal ed in the hub for rotation about axes crossing the rotational axis for blade pitch control as well as rotation about the rotational axis with the hub. The system includes a pitch change mechanism including a motor for rotating the blades in unison about the crossing axes between at least a coarse pitch position and a fine pitch position. A main pitch control is provided for normally operating the pitch change mechanism. There is further included a secondary control for operating the pitch change mechanism in response to the existence of at least one undesirable propeller condition and includes a target carried by the propeller along with a target pickup for sensing the target and generating a target signal. A function generator receives the target signal and generates at least one propeller condition signal indicating when at least one undesirable propeller condition occurs. A logic device is responsive to the propeller condition signal and is connected to the pitch change If mechanism and causes the pitch change mechanism to change the pitch of the blades to a pitch whereat the undesirable propeller condition no longer exists.

In a preferred embodiment, the main pitch control includes two control channels and the logic device causes the pitch change mechanism to change the pitch of the blades to a more coarse position.

In one embodiment of the invention, the undesirable propeller condition is a propeller overspeed condition and the function generator generates the propeller condition signal when the angular velocity of the propeller about the rotational axis exceeds a predetermined value.

According to one embodiment of the invention, the undesirable propeller condition is a propeller blade pitch less than a flight idle pitch and the function generator generates the propeller condition signal when the pitch of the blades about the crossing axes is a fine pitch finer than a predetermined flight idle pitch.

In a highly preferred embodiment, there are two undesirable propeller conditions including a propeller overspeed condition and a propeller blade pitch less than a flight idle pitch and the function generator generates the propeller condition signal when either or both 1) the angular velocity of the propeller about the rotational axis exceeds a predetermined value and/or 2) the pitch of the blades about the crossing axes is a fine pitch finer than a predetermined fine idle pitch.

In a preferred embodiment, the logic device includes a series of logic gates.

In a preferred embodiment, there is further included a device for selectively disabling the secondary control as, for example, during ground operations.

In a preferred embodiment, the secondary control includes two separate, generally identical control channels, each including one of the function generators and one of the logic devices.

Other objects and advantages will become apparent from the following specification taken in connection with the accompanying drawings.

DESCRIPTION OF THE PREFERRED EMBODIMENT

Figure 1:
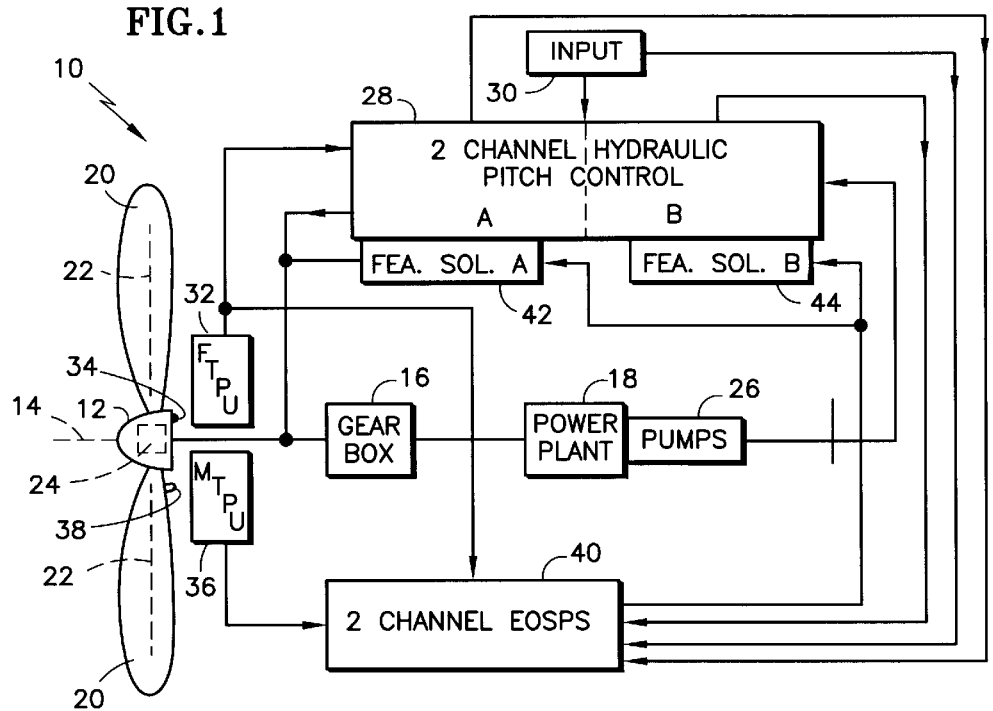
FIG. 1 is a schematic of a variable pitch propeller control system made according to the invention.

An exemplary embodiment of the invention is illustrated in FIG. 1 in schematic form and is seen to include a variable pitch propeller, generally designated 10. The propeller 10 includes a hub 12 which is rotatable about an axis 14. The propeller 10 is driven through a gear box 16 connected to a power plant 18 which will typically be a gas turbine engine but could, in some instances, be an internal combustion engine. The hub 12 mounts two or more propeller blades 20. Specifically, the hub 12 journals the propeller blades 20 for rotation about axes 22 which cross the rotational axis 14. Shown schematically within the hub 12 in dotted lines is a pitch control mechanism 24 which may be of conventional construction and which is ultimately driven by hydraulic fluid provided to it by one or more pumps 26 driven by the engine 18 and whose flow is modulated by a conventional, two channel hydraulic pitch control 28 which is the main control for the system. One channel is designated "A" while the other is designated "B". An input 30, conventionally pilot operated, provides information to the main control 28 for its use in controlling the propeller 10 in a conventional fashion.

The system includes a fixed target pickup unit 32 in close proximity to the propeller 10 to sense the presence of a metallic target 34. The fixed target pickup unit 32 is stationarily mounted while the target 34 rotates with the propeller 10. Though not shown in FIG. 1, in the usual case, there will be two of the fixed target pickup units, one for each of the channels A and B. The target 34 and pickup unit 32 may be of the general form disclosed in commonly assigned U.S. Pat. No. 5,865,599, the entire disclosure of which is herein incorporated by reference.

Also included is a movable target pickup unit 36 which senses the presence of another target 38 mounted on the propeller 10. The target 38 is, as inferred by the name of the movable target pickup unit 36, movable toward and away from the movable target pickup unit 36. In one position, it may be sensed by the movable target pickup unit and in another position, it cannot be sensed by the movable target pickup unit. Specifically, when the pitch of the blades 20 moves to a position finer than the fine pitch of flight idle, the target 38 is moved by means to be described hereinafter, into proximity with the movable target pickup unit 36 so as to be sensed thereby. When the pitch of the blades 20 is as coarse as or coarser than the flight idle pitch, the target 38 cannot be sensed by the movable target pickup unit.

Both the fixed target pickup unit 32 and the movable target pickup unit 36 provide signals to a secondary or back-up control, generally designated 40. The fixed target pickup unit also provides signals to each of the control channels A and B of the main control 28.

As is well known, conventional hydraulic pitch main control systems such as that schematically shown at 28 include a so-called feather solenoid 42 which is controlled by airframe logic. This solenoid operates hydraulic valves which are opened when the airframe logic determines that the propeller should be feathered. When that occurs, the pressures of hydraulic fluids directed to the pitch change mechanism 24 are modified. This hydraulic fluid is applied to a motor within the pitch change mechanism 24, typically in the form of a reciprocating piston, and the change in pressure differential across the piston, drives the piston toward a feathering or coarse pitch position for the blades 20. This same solenoid 42 and a second feathering solenoid 44 may also receive signals for opening the associated valves from the secondary control 40. Alternatively, for additional redundancy, two further feathering solenoids, one having a valve in parallel with the solenoid 42 and the other having a valve in parallel with the solenoid 44 may be operated by the secondary control 40.

It is to be particularly noted that while the invention is being described in the context of a hydraulic pitch control system, the same may be used with equal advantage in an electrical pitch control system wherein a motor, such as a stepper motor, forms part of the pitch change mechanism 24 and is employed in altering the pitch of the blades 20 in lieu of a motor in the form of a piston.

Figure 2:
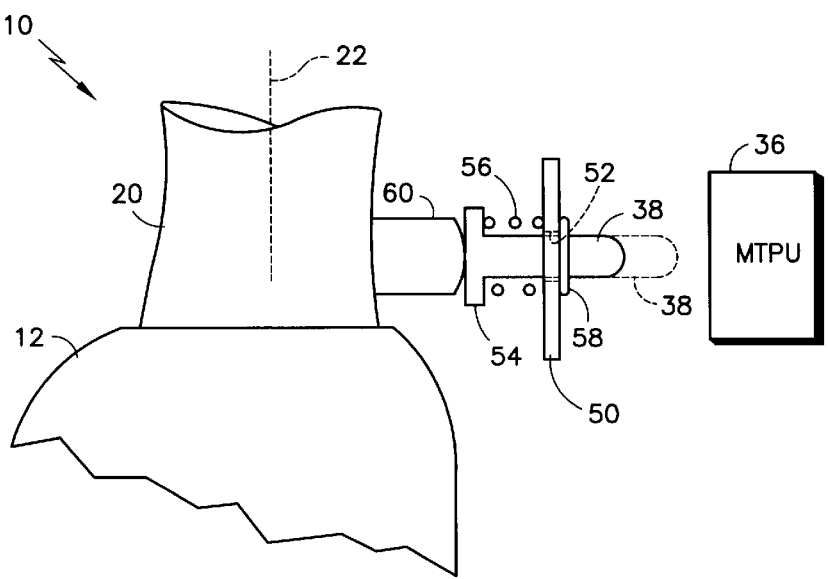
FIG. 2 is an enlarged, fragmentary somewhat schematic view of one target and associated pickup sensor illustrating their association with a propeller blade.

One form of the target 38 is illustrated in FIG. 2. An element 50 rotatable with the propeller 10 includes an aperture 52 through which the target 38 extends and which is aligned to pass the movable target pickup unit 36. The target 38 has a head 54 on its end most remote from the pickup unit 36 and a compression coil spring 56 extends between the head 54 and the mounting element 50. Any suitable retaining device 58 may be located on the pickup unit 36 near its end closest to the pickup unit 36 and a shoulder 60 is disposed on one of the blades 20 in a position to engage the head 54. The shoulder 60 is located angularly about the crossing axis 22 for the blade 20 in question such that for all pitch conditions as coarse as or more coarse than flight idle, the target 38 will be in the solid line position illustrated in FIG. 2 and will consequently be sufficiently remote from the pickup 36 that it cannot be detected thereby. On the other hand, for pitches finer than flight idle, the shoulder 60 will cam the target 38 toward the pickup unit 36 to a position sufficiently close that it may be sensed thereby.

Figure 3:
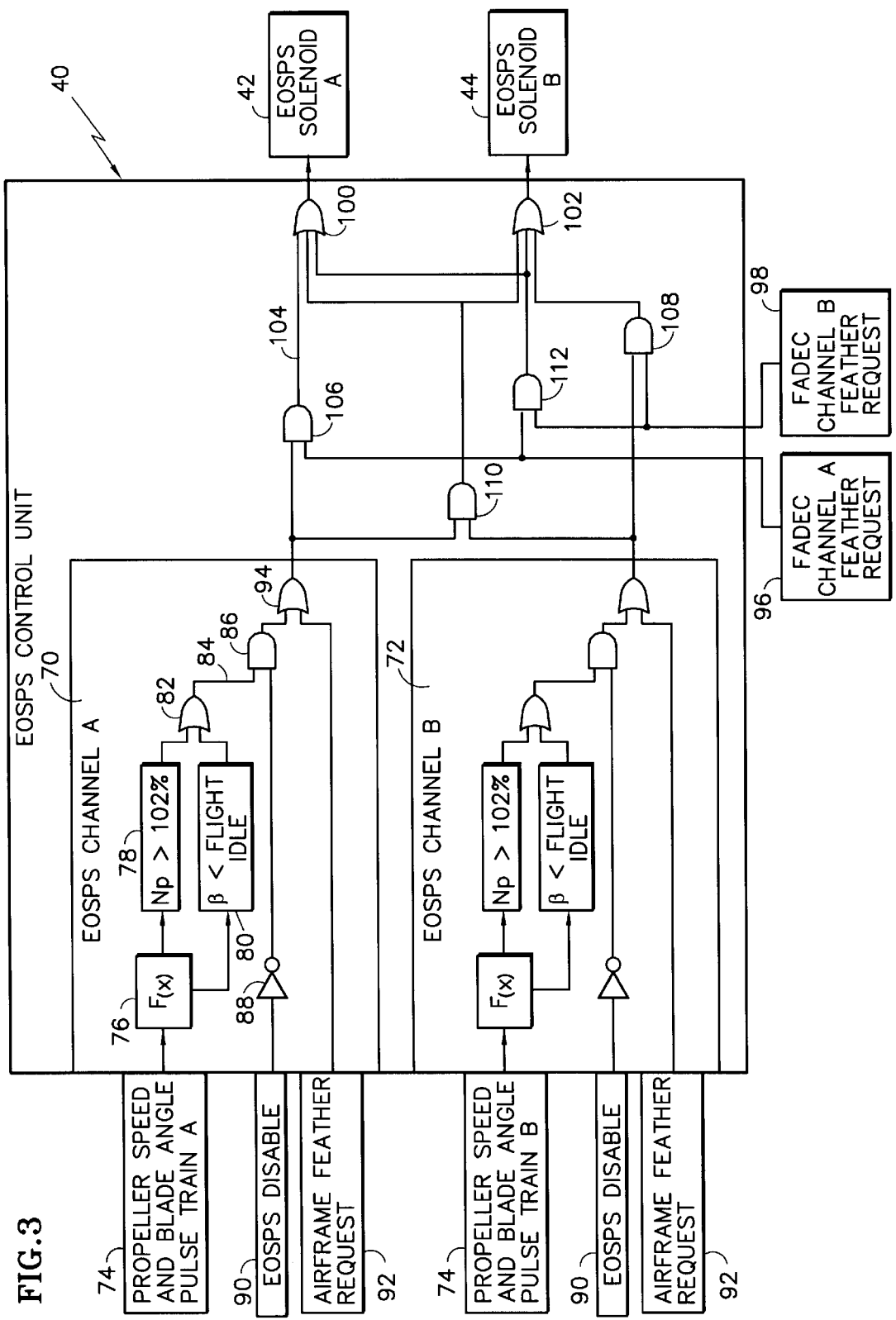
FIG. 3 is a logic diagram of a logic device employed as part of a secondary control system.

Turning now to FIG. 3, the secondary control 40 will be described. As noted previously, it preferably is a two channel secondary control with one channel being designated 70 and the other being designated 72. As both the channels 70 and 72 are identical, one to the other, only the channel 70 will be described. The channel 70 is associated with the A channel of the main control 28 while the channel 72 is associated with the B channel of the main control 28. To this end, each receives inputs as indicated by a block 74 from the fixed target pickup unit 32 and the movable target pickup unit 36 for the associated channel. These inputs are in the form of a string of pulses with each pulse being generated each time one of the targets 34, 38, is sensed by the corresponding pickup unit 32,36. In normal operation, pulse trains corresponding only to those sensed by the fixed target pickup unit will be present. This pulse train is provided to a function generator 76 of conventional construction. And, when present, a pulse train from the movable target pickup unit 36 will likewise be fed to the function generator 76.

In the usual case, with only the fixed target pickup unit 32 generating pulses, the number of pulses sensed over a given period of time is indicative of the angular velocity of the propeller 10 and the function generator 76 will be quiescent, that is, will not provide an output. However, if an overspeed condition occurs, over the same time interval, a greater number of pulses will be sensed by the function generator 76. Should this number of pulses be indicative of an angular velocity greater than 102% of the predetermined maximum velocity for the propeller 10, an overspeed signal will be issued as indicated by a box 78. Similarly, should the function generator 76 begin to receive pulses from the movable target pickup unit 36, those pulses, in addition to those received from the fixed target pickup unit will generate a pulse input of approximately twice that for normal operation. As this can occur only when the propeller 20 has been moved to a pitch less than flight idle, the function generator 76 will respond to the vastly increased number of pulses to generate a pitch less than flight idle signal as indicated by a box 80. These signals are provided as an input to an OR gate 82 which in turn provides an output on a line 84 indicative of the presence of either or both of the above-described undesirable propeller conditions.

The line 84 is connected as an input to an AND gate 86 which in turn receives a second input from an inverter or NOT gate 88. The inverter 88 receives an input signal indicating that the associated channel of the secondary system 40 should be disabled as indicated by a box 90. This disabling signal will typically be generated by the pilot through an appropriate control during certain situations, most notably, ground operations when propeller pitch less than flight idle may be desired or, if the propeller is constructed to provide the reverse thrust, when reverse thrust is applied. As a consequence of this construction, the AND gate 86 can only issue a signal for ultimately causing operation of the secondary control system 40 when no disabling signal is present at the box 90. Needless to say, associated interlocks will be provided so that the disabling signal cannot be inadvertently issued when the aircraft is airborne as is well known in the art.

Another input to the channel 70 is an air frame feather request input as indicated by a box 92. This signal will typically be issued by the pilot when, for any reason, he desires the propeller to be moved to a feathered pitch condition. This signal is applied as an input to an OR gate 94 which also receives the output of the AND gate 86. Thus, the output of the OR gate 94 will go true whenever there is an air frame feather request or a determination of overspeed or a propeller blade pitch of less than flight idle has been made with the system not disabled.

When either of the OR gates 94 in the channels 70 and 72 go true, they are integrated with signals generated elsewhere on the aircraft as well as in the other channel. For example, if the main control channel A issues a feather request as indicated by a box 96, or if a similar feather request is received from channel B as indicated by a box 98, these signals are provided to various gates to be described. Ultimately, a true output from an OR gate 100 will cause operation of the feather solenoid for the A channel 42 while a true output from an OR gate 102 will result in a similar signal to the feather solenoid 44 for the B channel of the main control.

Viewing first the inputs to the OR gate 100, one input can be received on a line 104 from the output of an AND gate 106. The AND gate 106 is connected to receive the output of the OR gate 94 for the channel 70 as well as a feather request from the A channel of the main control 28. Consequently, the solenoid 42 will be energized whenever the output 94 for the channel 70 goes true and a channel A feather request as shown at block 96 is present.

A similar AND gate 108 operates in the same fashion when the OR gate 94 for the channel 72 shows true and a channel B feather request is received from the main control 28.

In addition, an AND gate 110 is connected to the output of the OR gates 94 for both of the channels 70, 72 and has its output connected as an input to both of the OR gates 100 and 102. Consequently, if both the channels 70 and 72 detect one or the other or both of the undesirable propeller conditions, both of the solenoids 42 and 44 will be energized to cause the pitch change mechanism 24 (FIG. 1) to move the blades 20 towards a feathered or coarse position.

Finally, an AND gate 112 is connected to receive both of the main control feather requests shown at blocks 96 and 98. When both are present, its output will go true and is fed to both the OR gates 100, 102 to energize both of the solenoids 42 and 44.

Thus, it will be appreciated that either one of the channels 70, 72 of the secondary control 40 may be disabled when a disable signal is present at the corresponding input block 90. This signal effectively prevents the corresponding AND gate 86 from going true and providing a true input to the corresponding OR gate 94. At the same time, if an air frame feather request, as for example, generated by the pilot, and present at corresponding block 92 is present, the output of the corresponding OR gate 94 may go true.

Assuming the absence of a disabling signal, the outputs of the AND gates 86 may go true to the corresponding OR gates 94 whenever an overspeed condition or a pitch less than flight idle pitch is determined to exist. The secondary channel 70 associated with the A channel can have its associated solenoid 42 energized to cause the pitch change mechanism to move the blades 20 towards a coarser position only when one of the AND gates 106, 110 or 112 goes true. The AND gate 106 will go true only when there is an undesirable propeller condition determined by the channel 70 or when the same receives an air frame feather request and a feather request is received from the main channel at block 96. The output of the AND gate 110 may only go true when both the channels 70 and 72 have their OR gates 94 with true outputs which, in turn, can only occur during the presence of an undesirable flight condition or an air frame feather request. The AND gate 112 can only go true when feather requests are received from both channels of the main control.

The AND gate 108, which may cause the solenoid 44 to be energized, can only go true for the same conditions as the AND gate 106 except for the fact that the channel 72 and the B channel of the main control are involved. As a consequence, in a system where the main control has two channels and the secondary control 40 has two channels, it will be appreciated that at least two of the channels must be directing a change in blade pitch towards the feathering condition before the system will respond. Consequently, failure in any one of the four channels will not be recognized as the presence of a command from the pilot or as the existence of an undesirable propeller condition. Reliability, is thus assured.

It will especially be appreciated that the system completely eliminates the need for mechanisms such as fly weight mechanisms as part of the secondary control function. Consequently, adjustments are virtually eliminated from the system thereby eliminating the maintenance cost associated therewith.

I claim:

1. A variable pitch propeller and control system comprising:
   a propeller including a hub rotatable about a rotational axis, at least two propeller blades journaled in said hub for rotation about axes crossing said rotational axis for blade pitch control as well as for rotation about said rotational axis with said hub;
   a pitch change mechanism, including a motor, for rotating said blades in unison about said crossing axes between at least a coarse pitch position and a fine pitch position;
   a main pitch control for normally operating said pitch change mechanism; and a secondary control operating said pitch change mechanism in response to the existence of at least one undesirable propeller condition and including a target carried by said propeller, a target pickup for sensing the target and generating a target signal, a function generator receiving said target signal and generating at least one propeller condition signal indicating when at least one said undesirable propeller condition occurs, and a logic device responsive to said propeller condition signal and connected to said pitch change mechanism and causing said pitch change mechanism to change the pitch of said blades to a pitch whereat said at least one undesirable propeller condition no longer exists.

2. The variable pitch propeller and control system of claim 1 wherein said main pitch control includes at least one control channel and said logic device causes said pitch change mechanism to change the pitch of said blades to a more coarse pitch position.

3. The variable pitch propeller and control system of claim 1 wherein said undesirable propeller condition is a propeller overspeed condition and said function generator generates said propeller condition signal when the angular velocity of said propeller about said rotational axis exceeds a predetermined value.

4. The variable pitch propeller and control system of claim 2 wherein said undesirable propeller condition is a propeller blade pitch less than a flight idle pitch and said function generator generates said propeller condition signal when the pitch of said blades about said crossing axes is a fine pitch h fine r than a predetermined flight idle pitch.

5. The variable pitch propeller and control system of claim 2 wherein there are two said undesirable propeller conditions including a propeller overspeed condition and propeller blade pitch less than a flight idle pitch, and said function generator generates said propeller condition signal when either or both (1) the angular velocity of said propeller about said rotational axis exceeds a predetermined value, and or (2) the pitch of said blades about said crossing axes is a fine pitch finer than a predetermined flight idle pitch.

6. The variable pitch propeller and control system of claim 2 wherein said logic device includes a series of logic gates.

7. The variable pitch propeller and control system of claim 2 further including a device for selectively disabling said secondary control.

8. The variable pitch propeller and control system of claim 1 wherein said secondary control includes two separate, generally identical control channels, each including one of said function generators and one of said logic devices.

* * * * *